(No Model.) 2 Sheets—Sheet 1.

P. BILLINGHAM.
MEAT MINCING MACHINE.

No. 362,484. Patented May 10, 1887.

Witnesses.
H. W. Elmore
Fred V. Fischer

Inventor.
By his Attorney, Philip Billingham
V. C. Lowthorp, jr.

N. PETERS. Photo-Lithographer. Washington. D. C.

(No Model.) 2 Sheets—Sheet 2.

P. BILLINGHAM.
MEAT MINCING MACHINE.

No. 362,484. Patented May 10, 1887.

Witnesses,
H. W. Elmore
Fred V. Fischer

Inventor.
Philip Billingham
By his Attorney,
F. C. Lowthorp Jr.

UNITED STATES PATENT OFFICE.

PHILIP BILLINGHAM, OF CHAMBERSBURG, NEW JERSEY.

MEAT-MINCING MACHINE.

SPECIFICATION forming part of Letters Patent No. 362,484, dated May 10, 1887.

Application filed December 26, 1885. Serial No. 186,689. (No model.)

*To all whom it may concern:*

Be it known that I, PHILIP BILLINGHAM, a citizen of the United States, residing at Chambersburg, in the county of Mercer and State of New Jersey, have invented certain new and useful Improvements in Meat-Mincing Machines, of which the following is a specification, reference being had to the accompanying drawings, in which like letters indicate like parts.

My invention relates to that class of meat-mincing machines shown and described in United States Letters Patents No. 328,641, granted to me for improvements in meat-mincing machines, and dated October 20, 1885.

The object of my invention is to provide an improved knife-shaft and knives for such machines, and to furnish improved adjustable washers to retain the knives in proper position on the shaft; reversible counter-blades for the knife-plate, to obviate frequent sharpening, and an improved spindle upon which the bowl rotates, thus obviating lost motion, changing the point at which power is applied to rotate the bowl, and preventing unnecessary strain.

Figure 1:
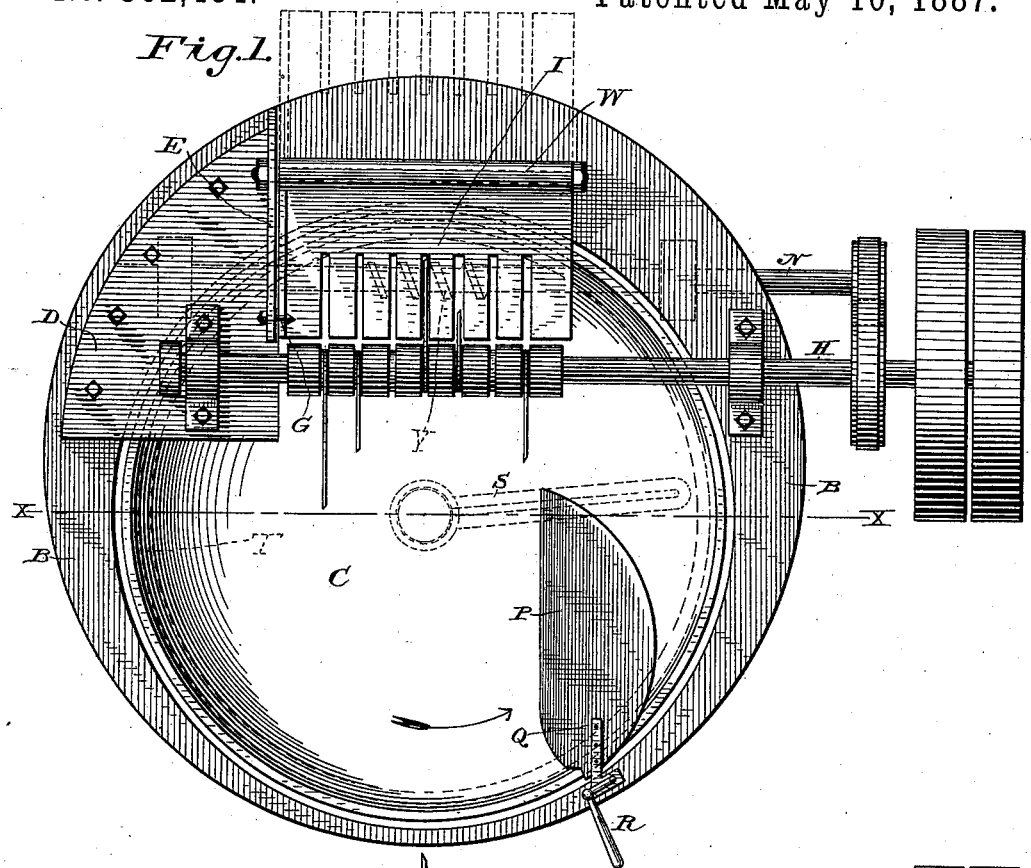
Figure 2:
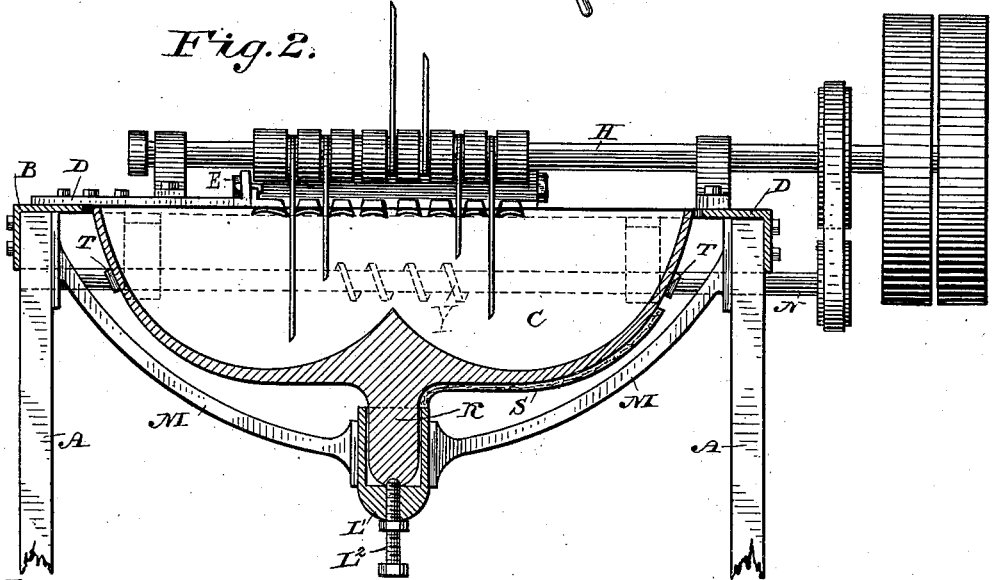
Figure 3:
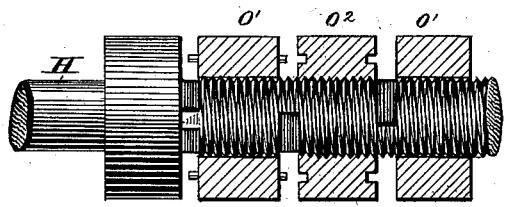
Figure 5:
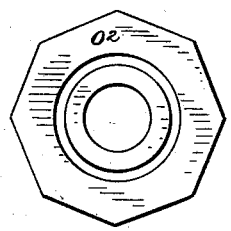
Figure 4:
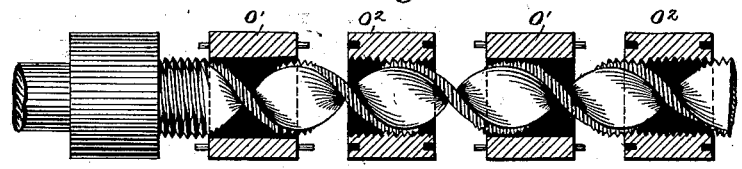
Figure 7:
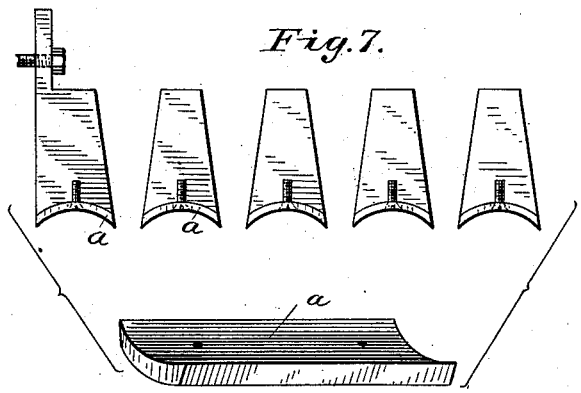
Figure 9:
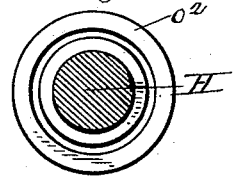
Figure 8:
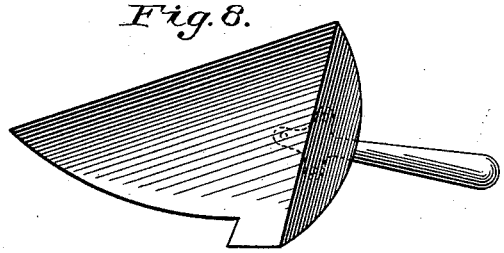
Figure 6:
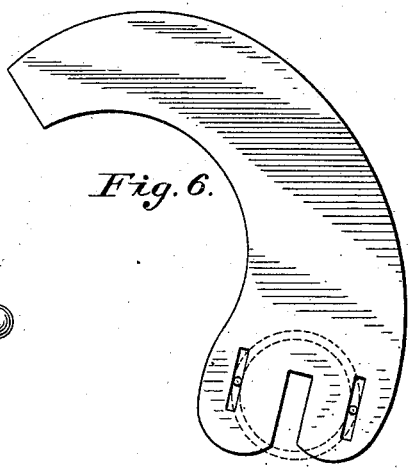

In the accompanying drawings, Figure 1 is a plan view of the machine; Fig. 2, a vertical sectional view in the line $xx$ of Fig. 1; Fig. 3, a detail view, on an enlarged scale, of a part of the knife-shaft; Fig. 4, an enlarged view of part of a modified form of knife-shaft; Fig. 5, an enlarged plan view of a knife-shaft washer; Fig. 6, an enlarged view of a knife; Fig. 7, an enlarged sectional view of the knife-plate, showing the reversible counter-blades; Fig. 8, a view of a hand-scoop to be used in removing the meat from the bowl; and Fig. 9, a cross-sectional view of the shaft, showing one of the washers $O^2$ in side elevation.

The machine rests upon four posts or standards, two of which are shown at A in Fig. 2. Resting upon the standards A, and securely fastened thereto, is a circular flanged iron table, B. In this table is a large circular opening of sufficient diameter to admit the top of the bowl C, which stands almost on a level with the top of the table B. On top of the table B is bolted the iron plate D, which has on its side next the knife-plate a bracket or wall, E. (Shown in Fig. 1.) The wall or bracket E may be made by bending up the side of the plate D, or by securing to it a casting or piece of angle-iron of convenient height. The bracket E serves to stiffen the plate D and to retain in position the knife-plate by means of the clamp G. On the plate D and table B are secured the journals, in which revolves the knife-shaft H.

I is the knife-plate, so slotted as to admit of the knives passing closely through it. When in position for work, the knife-plate is fastened to the bracket E by the clamp G, and when it is desired to get at the knives the clamp G is loosened and the knife-plate thrown back upon the hinge W, as shown by the dotted lines in Fig. 1.

The bowl C is of cast-iron, the center of the bottom rising to a point, as shown in Fig. 2. On the bottom of the bowl is the spindle K, which fits closely into the cup L' and rests upon the pin or pivot $L^2$, the head of which fits into a slight circular depression in the bottom of the spindle, and upon it the spindle and bowl revolve. This pin $L^2$ is inserted through the bottom of the cup L' by a threaded opening, and is clamped by a lock-nut, as shown in Fig. 2.

The cup or box L' is supported by four iron braces, M, fastened to the table B or the standards A, two of which appear in Fig. 2. The lubricator is introduced into the cup L' from an ordinary oil-cup or through a channel cast on the outside of the bowl, as shown at S.

The bowl C is revolved in the direction of the arrow in Fig. 1 by the worm-screw Y on the shaft N, which receives its motion from a pulley on the knife-shaft H. This worm-screw Y works into a row of cogs, T, on the outside of the bowl C. That part of the knife-shaft upon which the knives are placed is slotted, as shown in Fig. 3, to hold the knives at proper angles to each other. This part of the shaft is also threaded to admit of the adjustment of the washers O' and $O^2$. These washers are of a thickness proportionate to the spaces on the knife-shaft between the slots for the butts of the knives. The washers O' are loose and slip upon the threaded shaft, and have two pins on a diameter-line of each face, as shown in Fig. 3. The washers $O^2$ are threaded to screw snugly on the shaft, and have on each face a concentric slot, in which the pins on the washers O' fit when the washers are in position on the knife-shaft. The slots on the faces of the washers O² are shown in sectional view in Fig. 3 and in plan view in Fig. 5. The knives, as shown in Fig. 6, have in the butt three slots, one open and two closed. The knife is placed upon the slotted part of the shaft by the open slot in the butt of the knife. The washers are then slipped and screwed against the knife, and the pins on the washers O' are passed through the closed slots in the butt of the knife and enter the circular slot in the washer O². Knife after knife is thus placed until all are tightly clamped on the shaft. The pins on the washers O' thus prevent any escape of the knife from the shaft when in use.

At one end of the threaded part of the knife-shaft H is a shoulder cast with or forged upon the shaft, and on the face of this shoulder next the threads is a concentric slot similar to the slots on the washers O², into which the pins in the first washer O' fit and clamp the first knife, as shown in Fig. 3.

In the modified form of knife-shaft shown in Fig. 4 that portion of the shaft intended to accommodate the knives and washers is swaged out into a strap equal in width to the inside diameter of the screw-washers O². It is then twisted in the general form of an auger, as shown in the drawings, the degree of the twist being proportioned to the thickness of the washers. The strap part of the shaft is then threaded on the edges to admit of screwing thereon the washers O². The knives are slipped by their open slots over the edges and down upon the twisted strap, and the twist of the strap being proportioned to the thickness of the washers, when the washers are adjusted against the knives, the knives project from the shaft at equal and proper angles relatively to each other.

The reversible counter-blades $a$ of the knife-plate (shown in Fig. 7) are arched and are ground on the sides, and are fastened to the arms of the knife-plate (to which they are equal in length) by two metal screws in each. The knives are sharpened on one side and cut against one side on the counter-blades of the knife-plate. When these counter-blades are dulled, they are unscrewed, reversed end for end, and again screwed fast to the arms of the knife-plate. When the other side of the counter-blade is dulled, it is removed, sharpened on both sides, and reset.

The plow P (shown in Fig. 1) is made of metal and of a shape to conform closely to the inside of the bowl C. It is held in place by a strap, Q, riveted to it, which fits upon a pin on top of the table B, the pin passing through a slot in the strap. The lever R, being turned by the hand, passes a short arm over the strap Q, and so holds the plow in place.

When the machine is in operation, the meat is cut up and thrown into the bowl C, and by the motion of the bowl is turned by the plow P under the knives, is caught by them as they rapidly revolve, and cut between them and the counter-blades of the knife-plate, the operation being repeated until the meat is satisfactorily minced. When sufficiently minced, the meat is removed from the bowl by the hand-scoop. (Shown in Fig. 8.)

I claim as my invention and desire to secure by Letters Patent—

1. In a meat-cutting machine, the combination of a knife-shaft having a threaded periphery, knives mounted upon said shaft, and washers between the knives, provided, respectively, at opposite ends of the knife-butts with recesses, and projecting pins passing through the knives and into said recesses, substantially as shown and described.

2. In a meat-cutting machine, the combination of a knife-shaft having a threaded periphery, knives mounted upon said shaft, said knives having at their butt-ends closed slots, as shown, and open slots engaging with the knife-shaft, and washers between the knives, and provided, respectively, at opposite sides of the knife-butts with recesses, and projecting pins passing through the closed slots and into the said recesses, substantially as shown and described.

3. In a meat-cutting machine, the combination of a knife-shaft having a threaded periphery and a collar fixed thereon, one end of said collar having a circular recess, knives mounted upon said shaft, one number of the knife series being contiguous to the collar-recess, and alternate loose and threaded washers between the knives, and provided, respectively, at opposite sides of the knife-butts with recesses, and projecting pins passing through the knives and into said recesses, substantially as shown and described.

4. The combination of the washer O', having pins on its faces, and the threaded washer O², having a circular recess upon each of its faces, the knife with an open slot and closed slots in the butt, with the knife-shaft having that part of it adapted to retain the knives twisted and the edges of the twisted portion threaded, and having a shoulder with a circular recess on the face toward the twisted part of the shaft, substantially as shown and described.

5. The knife-shaft having that part of it which holds the knives cast or forged or swaged and twisted in the general form of an auger, and having threaded edges, substantially as shown and described.

6. In a meat-cutting machine, the combination of the bowl C, provided with the spindle K and cogs T, the cup L', adjustable pin L², knife-shaft H, the knives having one open slot and two closed slots in the butt, the washers O' and O², the knife I, having the counter-blades $a$, and the shaft N and worm-screw Y, substantially as shown and described.

In testimony whereof I have hereto affixed my signature in the presence of two witnesses.

PHILIP BILLINGHAM.

Witnesses:
CHARLES McDERMOTT,
F. W. MICHTEL.